United States Patent
Yasuoka et al.

(10) Patent No.: US 7,957,594 B2
(45) Date of Patent: Jun. 7, 2011

(54) OUTLINE DEFINITION APPARATUS AND OUTLINE DEFINITION METHOD, AND IMAGE PROCESSING APPARATUS

(75) Inventors: Tomohiro Yasuoka, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 11/748,868

(22) Filed: May 15, 2007

(65) Prior Publication Data

US 2007/0274594 A1 Nov. 29, 2007

(30) Foreign Application Priority Data

May 26, 2006 (JP) ................................. 2006-146209

(51) Int. Cl.
*G06K 9/48* (2006.01)
(52) U.S. Cl. ........ 382/199; 382/202; 382/204; 382/282; 382/173
(58) Field of Classification Search .................. 382/199, 382/202, 204, 282, 173
See application file for complete search history.

(56) References Cited

U.S. PATENT DOCUMENTS
7,218,763 B2 * 5/2007 Belykh et al. ................. 382/128

FOREIGN PATENT DOCUMENTS
JP 8-36641 2/1996
JP 2004-79970 3/2004
* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

An outline definition apparatus includes an edge detection unit detecting pixels at edge positions, each of the pixels at the edge positions having a data value between a value representing a first level and a value representing a second level, a pixel extraction unit extracting the pixels at the edge positions and extracting pixels in the vicinity thereof, a boundary-line generation unit generating a boundary line indicating a boundary between a region of the first level and a region of the second level in each of the pixels at the edge positions, and a link-processing unit obtaining an outline indicating a boundary between a region of the first level and a region of the second level in the still image by linking the boundary lines which are generated in the boundary-line generation unit and which are generated for the pixels which are located at the edge positions.

5 Claims, 17 Drawing Sheets

FIG. 3

| | HORIZONTAL DIRECTION → | | | | |
|---|---|---|---|---|---|
| VERTICAL DIRECTION ↓ | d(0,0) | d(0,1) | | d(0,N-2) | d(0,N-1) |
| | d(1,0) | d(1,1) | | d(1,N-2) | d(1,N-1) |
| | | | | | |
| | d(M-2,0) | d(M-2,1) | | d(M-2,N-2) | d(M-2,N-1) |
| | d(M-1,0) | d(M-1,1) | | d(M-1,N-2) | d(M-1,N-1) |

P

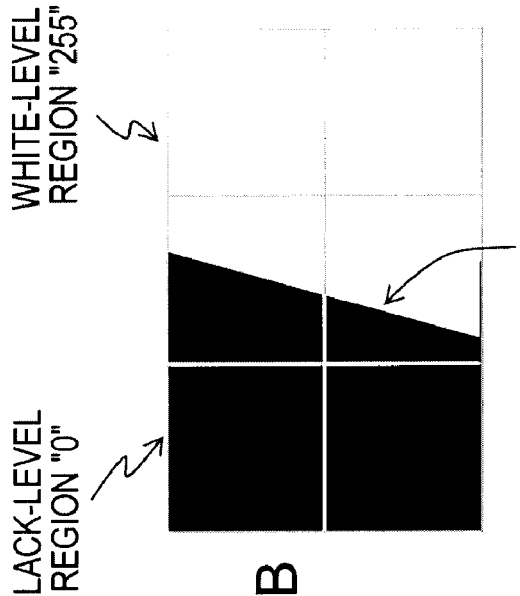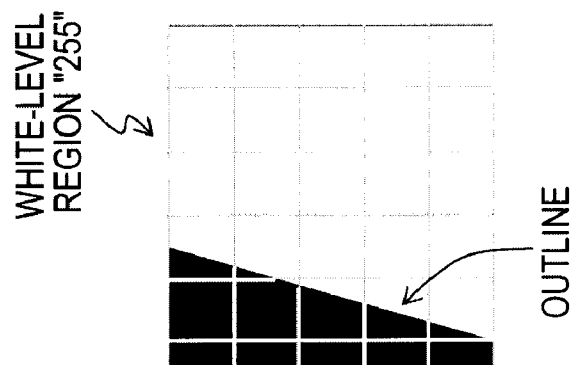
FIG. 15A
FIG. 15B
FIG. 15C
FIG. 15D

OUTLINE DEFINITION APPARATUS AND OUTLINE DEFINITION METHOD, AND IMAGE PROCESSING APPARATUS

CROSS REFERENCES TO RELATED APPLICATIONS

The present invention contains subject matter related to Japanese Patent Application JP 2006-146209 filed in the Japanese Patent Office on May 26, 2006, the entire contents of which are incorporated herein by reference.

BACKGROUND OF THE INVENTION

1. Field of the Invention

The present invention relates to outline definition apparatuses used to generate outlines which define boundary lines between first-level regions and second-level regions and outline definition methods, and relates to image processing apparatuses. More particularly, the present invention relates to an outline definition apparatus which defines an outline not in units of pixels but with high precision by generating boundary lines defining boundaries between first-level areas and second-level areas in pixels and linking the generated boundary lines.

2. Description of the Related Art

In general, in a field of image processing, a technique in which positions of edge of objects (hereinafter, referred to as "edge positions") in still images are detected has been used for various purposes. For example, Japanese Unexamined Patent Application Publication No. 8-36641 discloses a method for coding image data with a high coding rate not by coding image data itself but by coding edge data obtained by successively detecting edges of the image data. Furthermore, for example, Japanese Unexamined Patent Application Publication No. 2004-79970 discloses a method for detecting edge positions (mark positions) from an image captured using a CCD (charge coupled device) camera when an overlapping state of circuit patterns is detected using overlapping marks in the course of fabrication. In the detection of the edge positions, for example, pixel portions having data values significantly changed are detected.

SUMMARY OF THE INVENTION

In the methods for detecting edge positions disclosed in Japanese Unexamined Patent Application Publication Nos. 8-36641 and 2004-79970, the edge positions are detected in units of pixels. However, if the edge positions define an outline indicating boundary lines between black-level regions and white-level regions, for example, when enlargement processing of an image by incrementing the number of pixels is performed, detection of edge positions in more precise units than units of pixels is desirable.

Accordingly, it is desirable to attain outline definition not in units of pixels but with high precision.

According to an embodiment of the present invention, there is provided an outline definition apparatus including an edge detection unit configured to detect pixels located at edge positions of a still image, each of the pixels located at the edge positions having a data value between a value representing a first level and a value representing a second level that is larger than the value representing the first level, a pixel extraction unit configured to extract the pixels located at the edge positions which are detected using the edge detection unit and extract pixels in the vicinity of the pixels located at the edge positions, a boundary-line generation unit configured to generate, in accordance with a data value of each of the pixels extracted using the pixel extraction unit, a boundary line indicating a boundary between a region of the first level and a region of the second level in each of the pixels which are located at the edge positions and are detected using the edge detection unit, and a link-processing unit configured to obtain an outline indicating a boundary between a region of the first level and a region of the second level in the still image by linking the boundary lines which are generated in the boundary-line generation unit and which are generated for the pixels which are located at the edge positions and are detected using the edge detection unit.

Accordingly, the pixels located at the edge positions of a still image, each of the pixels located at the edge positions having a data value between a value representing a first level (i.e., a black level) and a value representing a second level (i.e., a white level), are detected from pieces of data relating to the pixels included in the still image. The detection of the edge positions is performed in units of pixels. Furthermore, an outline indicating boundaries of first-level regions and second-level regions of the pixels at the edge positions is defined with high precision. Here, each of the "first level" and the "second level" is a certain level, that is, a level having a predetermined range.

Specifically, the pixels located at the edge positions and pixels in the vicinity thereof are extracted, and boundary lines indicating boundaries between the first-level regions and the second-level regions of the pixels are generated in accordance with the data values of the pixels.

In this case, for example, for each of the pixels located at the edge positions, an angle of the boundary line in a pixel at an edge position is determined in accordance with differences between a data value of the pixel located at the edge position and data values of pixels in the vicinity of the pixel located at the edge position. Furthermore, intercepts of the boundary line in which the angle thereof has been detected are detected in accordance with a mixture ratio of the first level and the second revel representing the data value of each of the pixels located at the edge positions. Here, the intercepts are coordinates which are intersections of the boundary line and a pixel frame. The intercepts determine a position of the boundary line in each of the pixels located at the edge positions.

Furthermore, the boundary lines generated in the pixels located at the edge positions are linked to one another, whereby an outline indicating a boundary between a first-level region and a second-level region of a still image is obtained. For example, a direction of the boundary line of each of the pixels located at the edge position is set such that a pixel having a large data value is located on the left or right side, and a second boundary line to be connected to the first boundary line is set as a boundary line having a starting point nearest to an ending point of the first boundary line.

As described above, boundary lines indicating boundaries between the first-level regions and the second-level regions are generated in pixels which are located in the edge positions and which have data values between a value representing a black level and a value representing a white level, in accordance with data values of the pixels located in the edge positions and data values of pixels in the vicinities of the corresponding pixels. Thereafter, the boundary lines are linked to one another to generate an outline. The outline is defined not in units of pixels but with high precision.

For example, still-image data constituted by the number of pixels larger than that of original image data is generated using the outline defined as describe above. In this case, since the outline defines a boundary of a black-level region and a white-level region of a still image with high precision, the number of pixels which include the outline and therefore have data values between a value representing a black level and a value representing a white level, which is increased when the image is enlarged, may be reduced in an outline portion. Accordingly, an enlarged image having a clear outline may be obtained.

Accordingly, boundary lines indicating boundaries between the first-level regions and the second-level regions are generated in pixels which are located in the edge positions and which have data values between a value representing a black level and a value representing a white level, in accordance with data values of the pixels located in the edge positions and data values of pixels in the vicinities of the corresponding pixels. Thereafter, the boundary lines are linked to one another to generate an outline. The outline is defined not in units of pixels but with high precision.

BRIEF DESCRIPTION OF THE DRAWINGS

FIG. 3 shows a diagram illustrating a structure of a pixel;

FIGS. 15A to 15D show diagrams illustrating processing of data generation unit;

DESCRIPTION OF THE PREFERRED EMBODIMENTS

Figure 1:
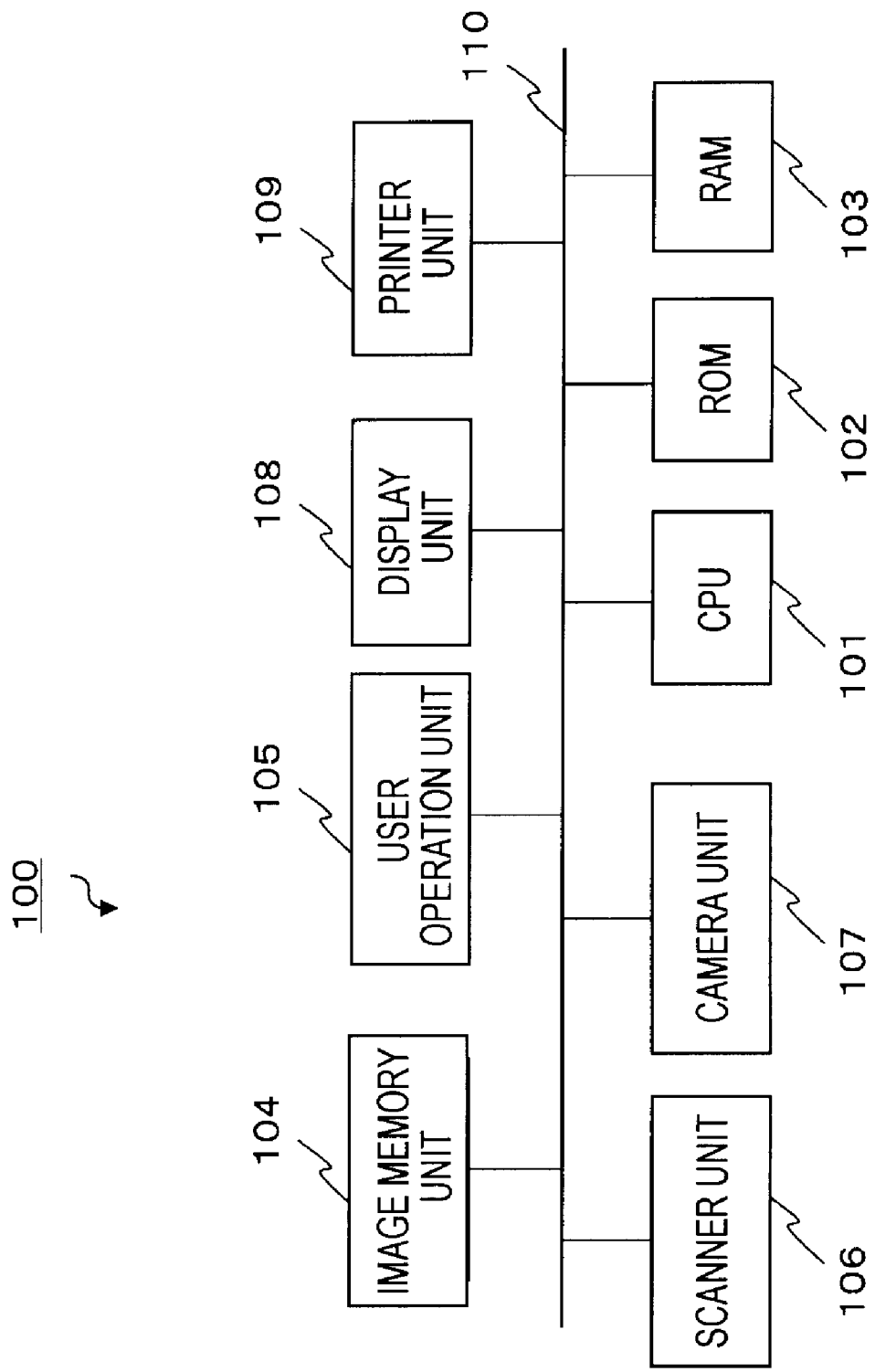
FIG. 1 is shows a block diagram illustrating a configuration of an image processing apparatus according to an embodiment of the present invention.

Embodiments according to the present invention will be described hereinafter with reference to the accompanying drawings. FIG. 1 shows a configuration of an image processing apparatus 100 according to an embodiment. The image processing apparatus 100 includes a CPU (central processing unit) 101, a ROM (read-only memory) 102, a RAM (random access memory) 103, an image memory unit 104, a user-operation unit 105 such as an mouse or a keyboard, a scanner unit 106, a camera unit 107, a display unit 108, and a printer unit 109, which are connected to one another through a bus 110.

The CPU 101 controls operation of the entire apparatus. The ROM 102 stores programs necessary for operating the CPU 101 and data. The RAM 103 functions as, for example, a working space for the CPU 101. The scanner unit 106 and the camera unit 107 serve as input units used to input still images represented by still-image data. The display unit 108 and the printer unit 109 serve as output units used to output still images represented by still-image data. Note that, here, the still-image data is monochrome image data including a plurality of pieces of pixel data. Each of the pieces of pixel data is eight-bit data having a value ranging from 0 to 255.

In the image processing apparatus 100 shown in FIG. 1, still-image data obtained by the scanner unit 106 or the camera unit 107 is processed by the CPU 101 in accordance with a user's operation using the user-operation unit 105. The processed still-image data is supplied to the display unit 108 or the printer unit 109 to be displayed as a display image or to be printed out as a printed image.

The CPU 101 performs processing on the still-image data to enlarge a region of the still image represented by the still-image data. In this image-enlargement processing, the number of pixels included in an image region to be enlarged is increased in accordance with an enlargement factor. For example, when the enlargement factor is 2, a half of the image region is selected as a region to be enlarged and the number of pixels included in the selected image region is increased to be twice the original number of pixels of the selected image region.

The CPU 101 includes an outline definition unit and a data generation unit which are used for the image-enlargement processing. The outline definition unit is used to obtain boundary lines between black-level regions as first-level regions and white-level regions as second-level regions on the basis of still-image data which has not yet been processed and which is stored in the image memory unit 104. The data generation unit is used to generate still-image data representing an enlarged image by increasing the number of pixels in the image region to be enlarged in accordance with an outline defined by the outline definition unit.

Figure 2:
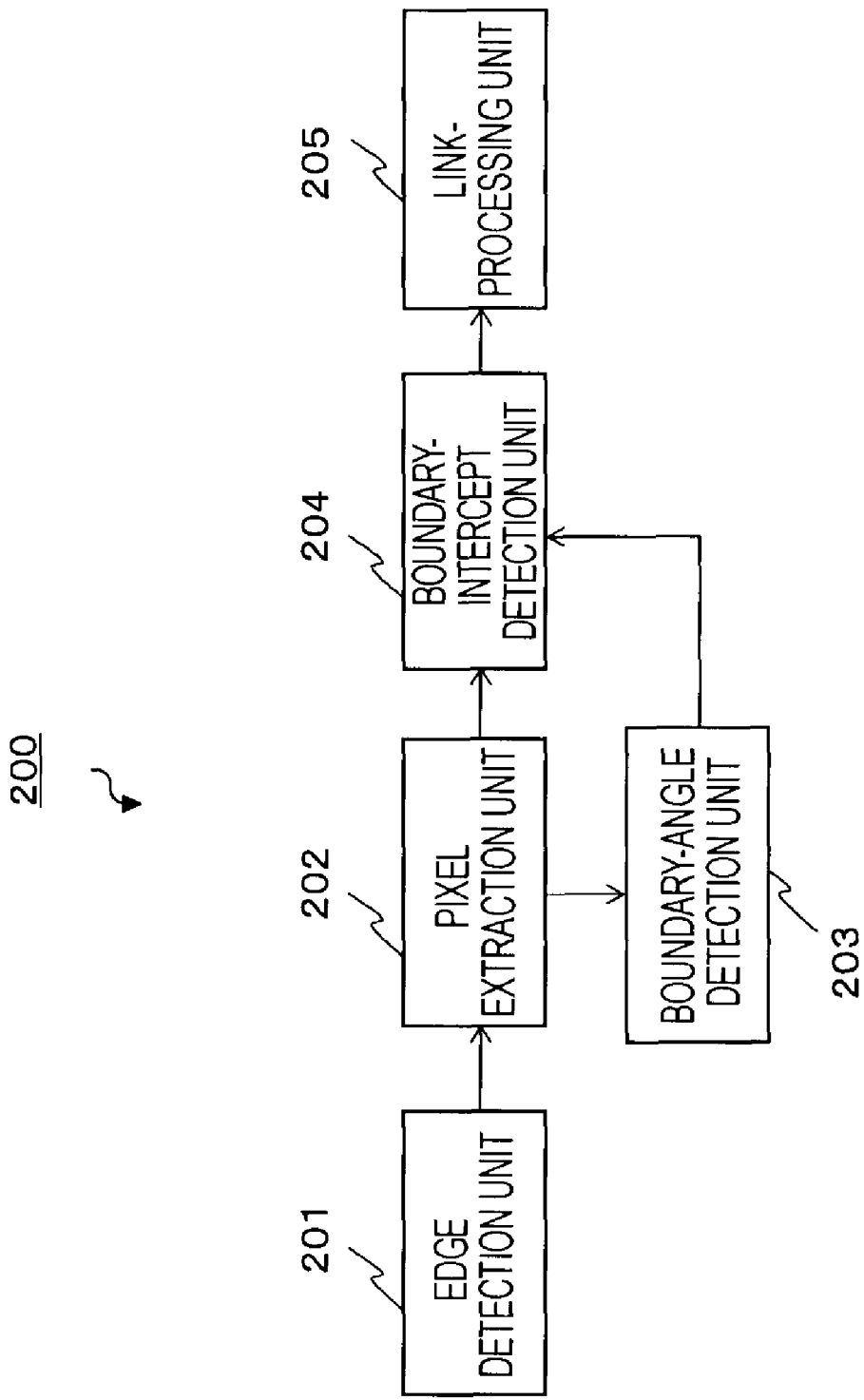
FIG. 2 shows a block diagram illustrating a function block of an outline definition unit.

FIG. 2 shows a function block diagram of an outline definition unit 200. The outline definition unit 200 includes an edge detection unit 201, a pixel extraction unit 202, a boundary-angle detection unit 203, a boundary-intercept detection unit 204, and a link-processing unit 205. The boundary-angle detection unit 203 and the boundary-intercept detection unit 204 serve as a boundary-line generation unit.

The edge detection unit 201 detects pixels at edge positions having data values between a value representing a black level and a value representing a white level. Note that a data value representing the black level is set to 0 and a data value representing the white level is set to 255. Pixels having data values of 1 to 254 are detected as pixels at edge positions. The data value representing the black level and the data value representing the white level may have predetermined ranges such that a data value representing the black level ranges from 0 to 10 and a data value representing the white level ranges from 245 to 255.

The pixel extraction unit 202 extracts pixels positioned at the edge positions and in the vicinity thereof in accordance with the edge positions detected by the edge detection unit 201. FIG. 3 shows a pixel structure of a still image. Pixels are arranged in a matrix of N pixels in the horizontal direction and M pixels in the vertical direction.

Figure 4C:
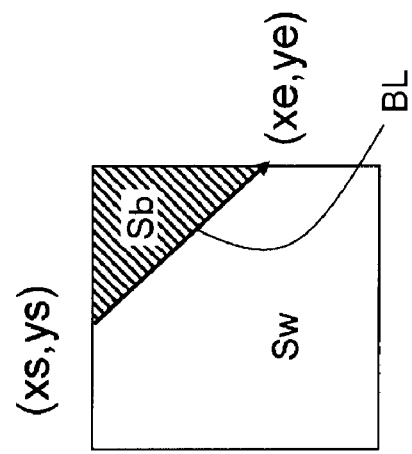
FIGS. 4A to 4C show diagrams illustrating processing of detection of boundary angles and boundary intercepts.
Figure 4A:
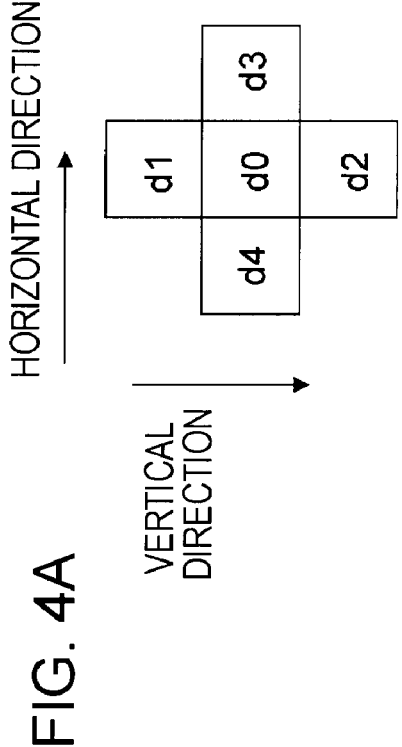

FIG. 4A shows an example of extracted pixels. In this case, a pixel d0 located at an edge position, pixels d1 and d2 located adjacent to the pixel d0 in the vertical direction, and pixels d3 and d4 located adjacent to the pixel d0 in the horizontal direction are extracted.

Figure 4B:
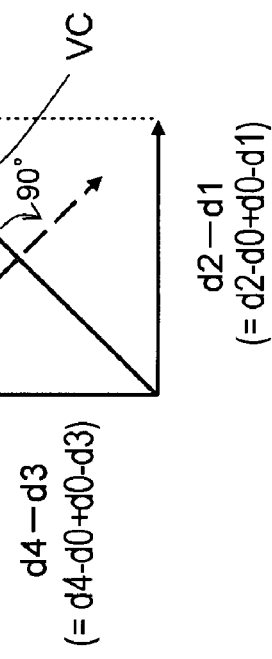

The boundary-angle detection unit 203 detects an angle of a boundary line defining a boundary between a black-level region and a white-level region in each of the pixels in accordance with differences between a data value of a pixel located at an edge position and data values of pixels located in the vicinity thereof. In this case, as shown in FIG. 4B, an angle of a boundary line (shown as a dotted line in FIG. 4B) is obtained by adding 90 degrees to an angle of a vector VC obtained from a horizontal-direction component d2−d1 (=d2−d0+d0−d1) and a vertical-direction component d4−d3 (=d4−d0+d0−d3).

The boundary-intercept detection unit 204 detects intercepts of a boundary line having the angle detected by the boundary-angle detection unit 203, as shown in FIG. 4C, in accordance with a mixture ratio of the black level to the white level representing the data value of each of the pixels located at the edge position. That is, the boundary-intercept detection unit 204 detects coordinates (xs, ys) and (xe, ye) which are intersections of the boundary line and a pixel frame. In this case, an area ratio of an area of a black-level region Sb in a square pixel and an area of a white-level region Sw in the square pixel corresponds to the above-described mixture ratio of the black level to the white level.

As described above, a boundary line BL indicating a boundary between the black-level region and the white-level region in the pixel are generated for each of the pixels at the edge positions. The boundary line BL represents a boundary between the black-level region and the white-level region in each of the pixels, each being located in one of the edge positions. The direction of the boundary line BL is set so that a pixel having a high data value is located on one of the right side or the left side, for example, in this embodiment, on the right side. In this case, as shown in FIG. 4C, the coordinate (xs, ys) is a starting point of the boundary line BL and the coordinate (xe, ye) is an ending point of the boundary line BL.

The link-processing unit 205 links boundary lines of pixels located at edge positions, which are generated by the above-described boundary-line generation unit (the boundary-angle detection unit 203 and the boundary-intercept detection unit 204), to one another, and obtains an outline defining a boundary between a black-level region and a white-level region in a still image. In this case, as shown in FIG. 5A, a second boundary line BL to be linked to a first boundary line BL is set as a boundary line having a starting point nearest to an ending point of the first boundary line BL.

Figure 5B:
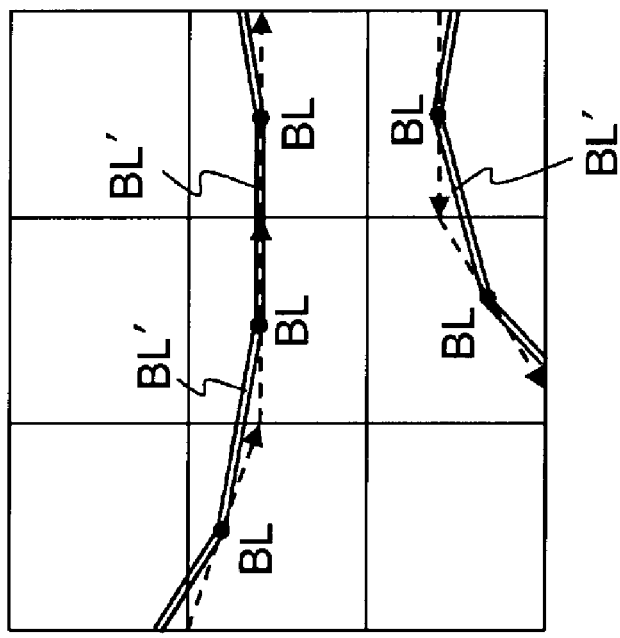
FIGS. 5A and 5B show diagrams illustrating link processing for boundary lines.
Figure 5A:
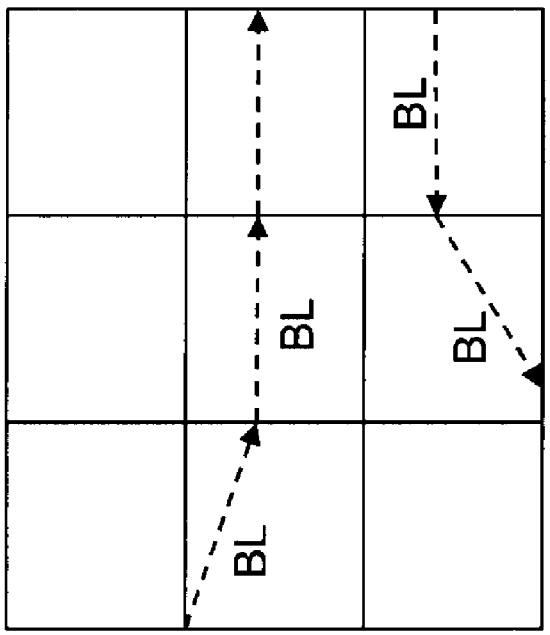

In FIG. 5A, the ending point of the first boundary line BL and the starting point of the second boundary line BL are linked to each other. However, coordinates of an ending point and a starting point do not coincide with each other in most cases. Therefore, in this stage of the link processing, as shown in FIG. 5B, each of the two boundary lines BL to be linked to each other are linked by a line BL' at middle points of the boundary lines BL. The lines BL' define an outline.

Operation of the outline definition unit 200 shown in FIG. 2 is described with reference to flowcharts shown in FIGS. 6 to 8.

Figure 6:
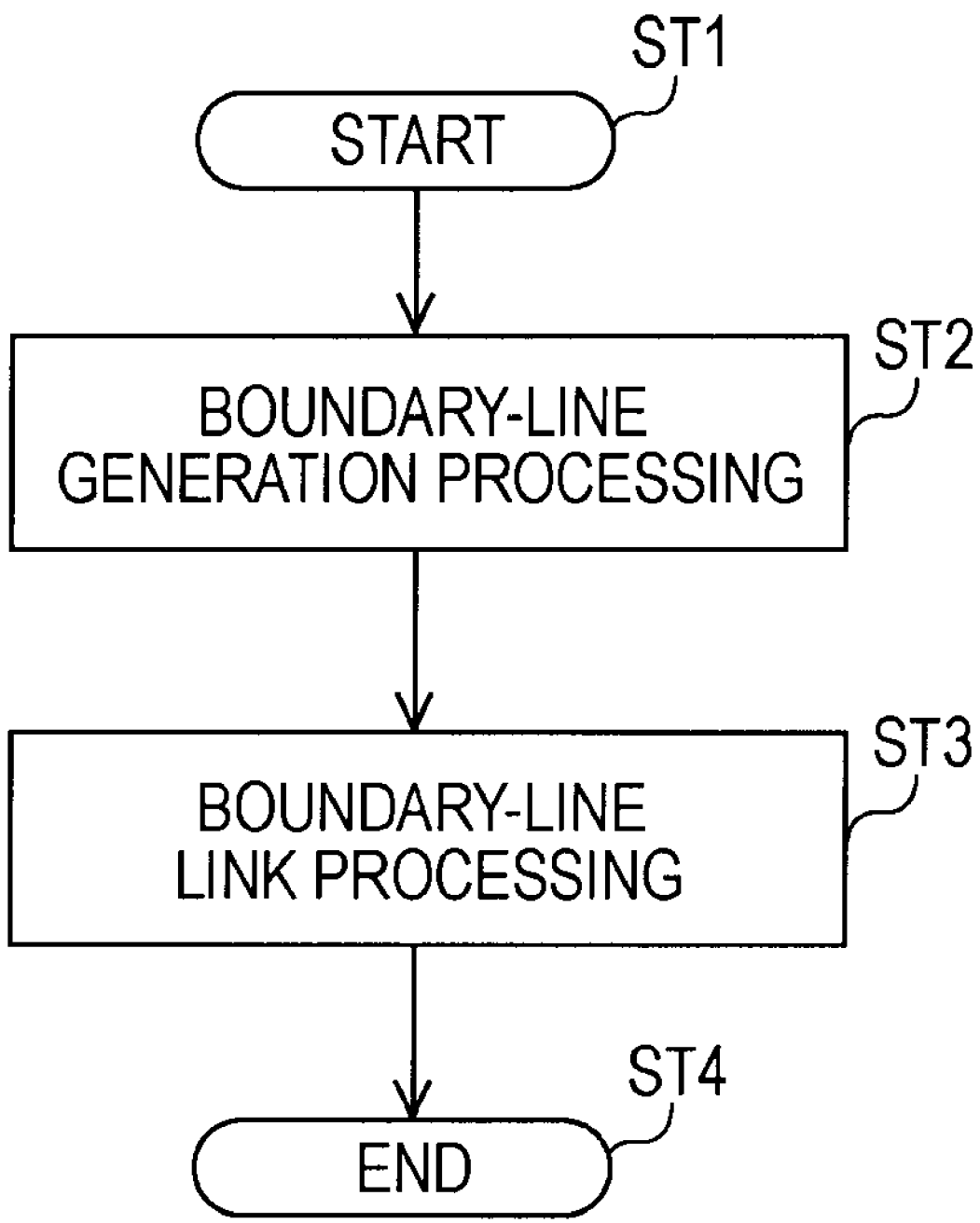
FIG. 6 shows a flowchart illustrating a processing procedure of boundary-line definition processing.

FIG. 6 shows a processing procedure of the outline definition processing. The process starts in step ST1, and boundary lines BL are generated for pixels located at edge positions in step ST2. In step ST3, an outline is defined by linking the boundary lines BL generated in step ST2, and then the process terminates in step ST4.

Figure 7:
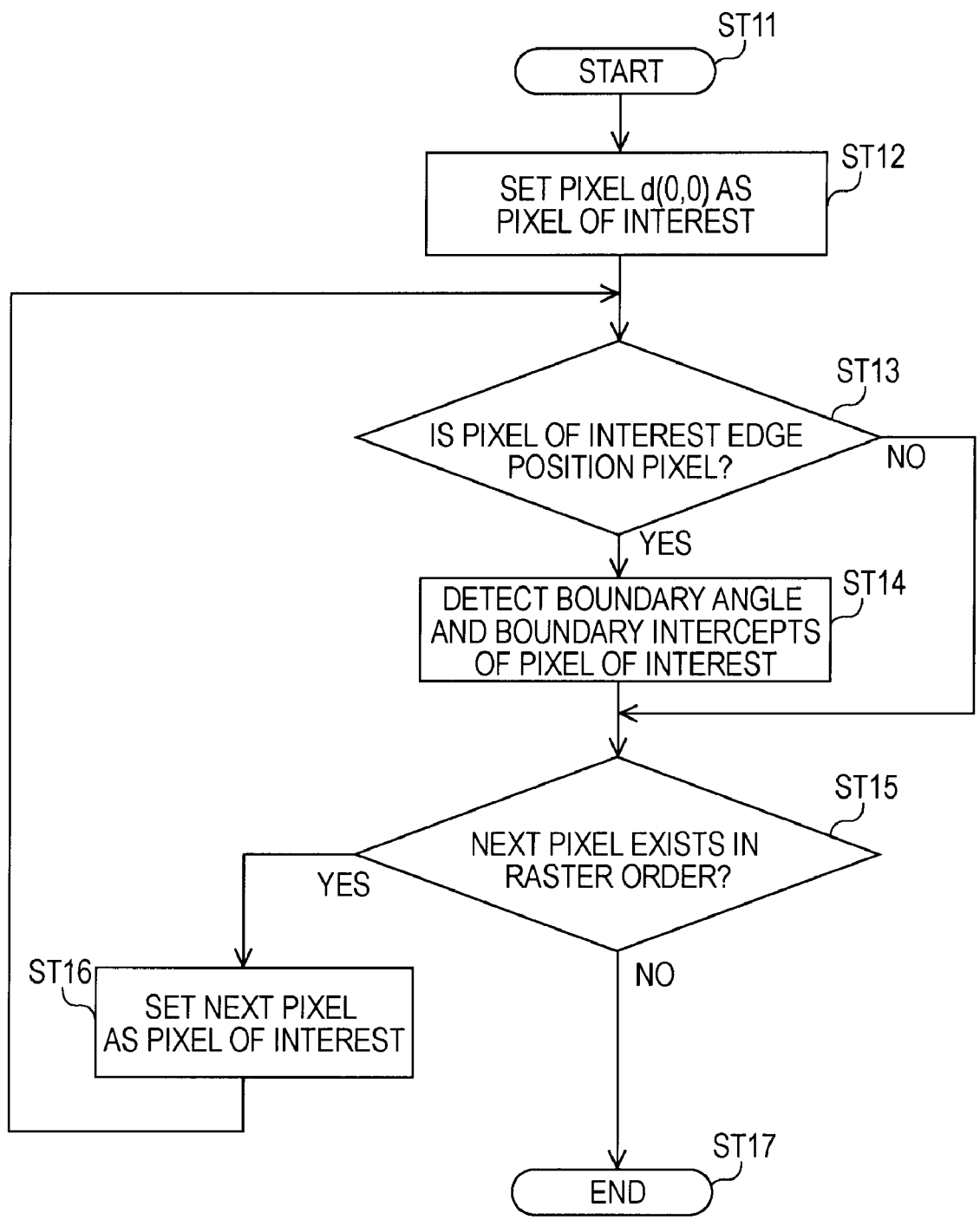
FIG. 7 shows a flowchart illustrating a processing procedure of boundary-line generation processing.

FIG. 7 illustrates the processing procedure of the boundary-line generation processing performed in step ST2 of FIG. 6 in detail. The process starts in step ST1, and the pixel d(0,0) on the left corner of a screen (refer to FIG. 3) is set as a pixel of interest in step ST12. In step ST13, it is determined whether the pixel of interest is located at an edge position. When a data value of the pixel of interest is in the range from more than 0 to less than 255, the pixel of interest is determined to be a pixel at an edge position.

Figure 9:
FIG. 9 shows a diagram illustrating a still image.
Figure 10:
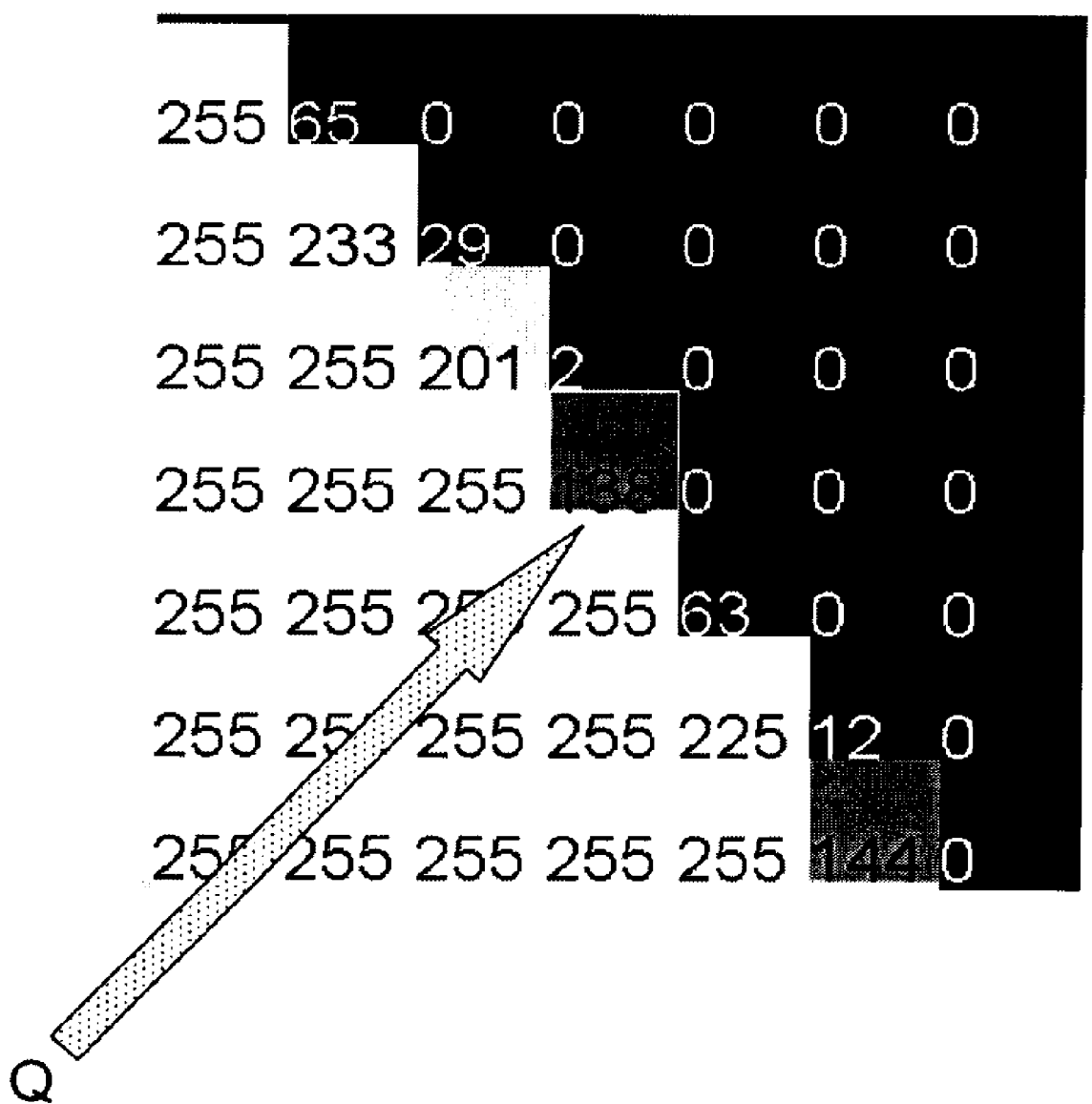
FIG. 10 shows an enlarged view of part of the still image and shows pixels at edge positions.

An image of a character is shown as an example of a still image in FIG. 9. FIG. 10 shows an enlarged view of part of the still image (indicated by an arrow P) shown in FIG. 9, and numeric values given to pixels are data values of the pixels. In this example, pixels having data values of 65, 233, 29, 201, 2, 138, 63, 225, 12, and 144 are located at edge positions.

Figure 11:
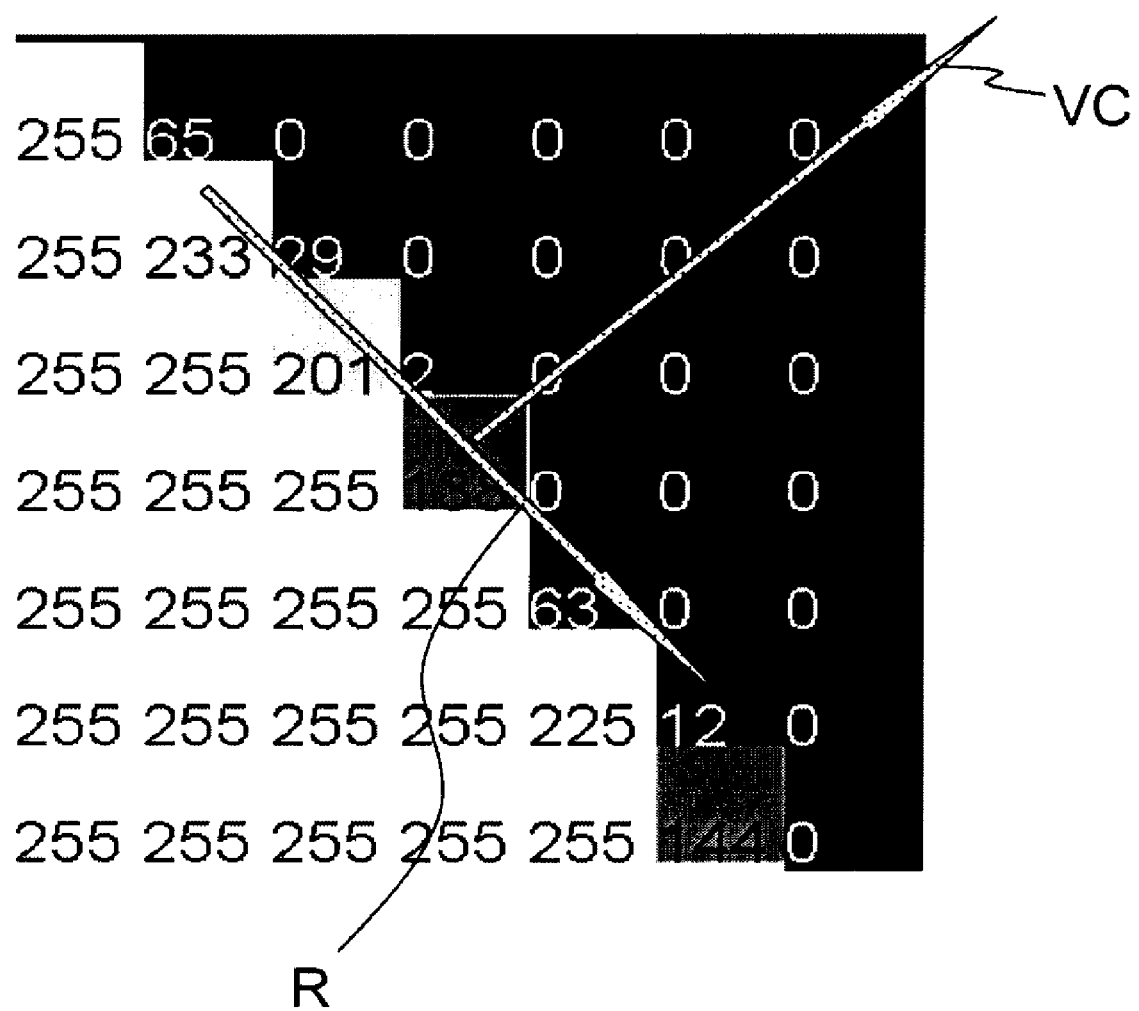
FIG. 11 shows the relationship between a vector and a boundary line angle.

When the pixel of interest is located at an edge position, an angle of a boundary line and intercepts of the boundary line are detected to thereby generate the boundary line of the pixel of interest. First, the angle of the boundary line is detected in accordance with differences between a data value of the pixel of interest (a pixel located at an edge position) and data values of pixels located in the vicinity of the pixel of interest (refer to FIGS. 4A and 4B). For example, if a pixel having a data value of 138 indicated by an arrow Q shown in FIG. 10 is a pixel of interest, the pixel having the data value of 138 is set as pixel d0, the pixel having the data value of 2 is set as pixel d1, the pixel having the data value of 255 is set as pixel d2, the pixel having the data value of 0 is set as pixel d3, and the pixel having the data value of 255 is set as pixel d4 in FIG. 4, and therefore, a horizontal-direction component d2-d1 of a vector VC is 253 and a vertical-direction component d4-d3 of the vector VC is 255. The boundary line is angled at 45 degrees relative to the horizontal direction to lower right side as shown by an arrow R in FIG. 11.

Next, the intercepts of the boundary line (refer to FIG. 4C) are detected in accordance with a mixture ratio of a black level to a white level representing the data value of the pixel of interest (a pixel located at an edge position). For example, if the pixel of interest has a data value 138, 46% of the area of the pixel of interest is constituted by a black-level region representing a data value of "0" and 54% of the area of the pixel of interest is constituted by a white-level region representing a data value of "255" which are mixed with together. In view of this, interceptions are detected so that an area ratio of a black-level region Sb to a white-level region Sw in a square pixel is set to 46:54.

After the process performed in step ST14, the process proceeds to step ST15. If the determination is negative in step ST13, the process directly proceeds to step ST15. In the step ST15, it is determined whether a next pixel exists in a raster order. Note that the raster order means an order of pixels from d(0,0), d(0,1), . . . , d(0, N-1), d(1,0), d(1,1), . . . , d(1, N-1), . . . , d(M-2, 0), d(M-2, 1), . . . , d(M-2, N-1), d(M-1, 0), d(M-1, 1), . . . , to d(M-1, N-1) in the pixel structure shown in FIG. 3.

When the determination is affirmative in step ST15, the next pixel is set as a pixel of interest in step ST16, and the process returns to step ST13 where a process the same as the process described above is performed. On the other hand, when it is determined that the next pixel does not exist, the process proceeds to step ST17 where the process is terminated.

Figure 12:
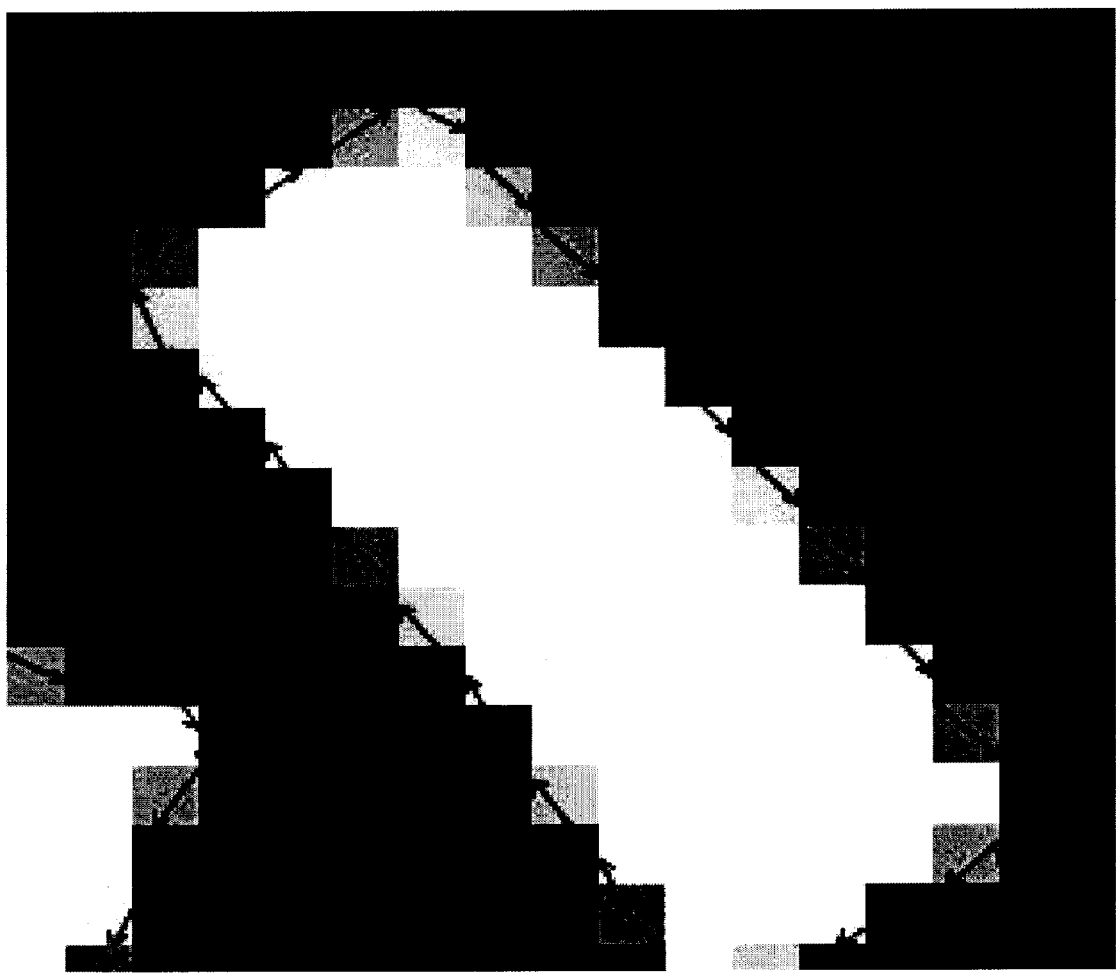
FIG. 12 shows a boundary line generated in each of the pixels at the edge positions.

The boundary-line generation processing is performed as illustrated in the flowchart of FIG. 7 whereby boundary lines BL for pixels located at edge positions are generated as shown in FIG. 12.

Figure 8:
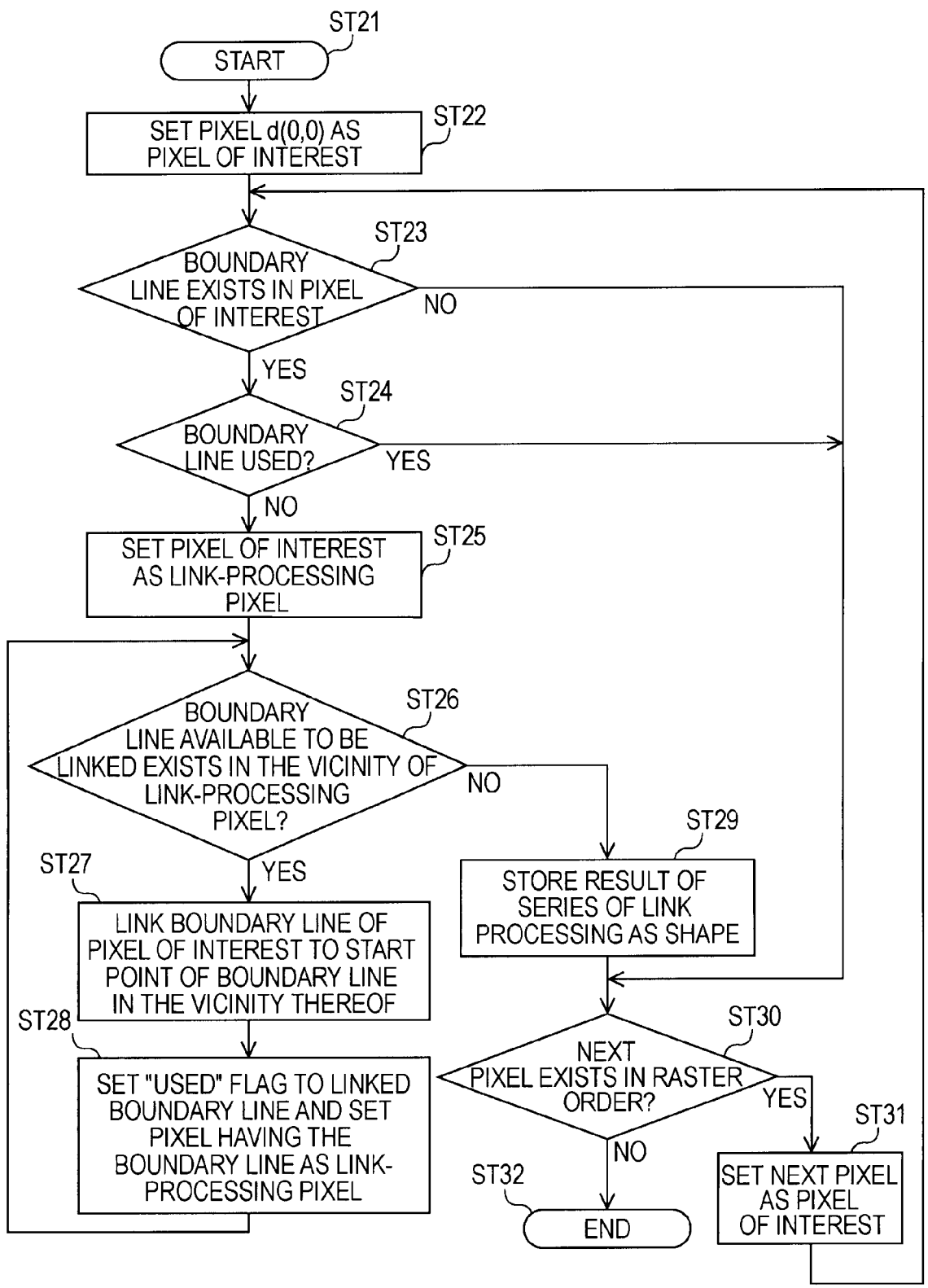
FIG. 8 shows a flowchart illustrating a processing procedure of boundary-line link processing.

FIG. 8 shows a processing procedure of boundary-line link processing performed in step ST3 of FIG. 6. The process starts in step ST21, and the pixel d(0,0) located in the left corner of the screen is set as a pixel of interest (refer to FIG. 3) in step ST22. In step ST23, it is determined whether the pixel of interest has a boundary line. When the determination is affirmative, the process proceeds to step ST24 where it is determined whether the boundary line has been used in previous link processing. When the determination is negative, the process proceeds to step ST25 where the pixel of interest is set as a link-processing pixel which should be subjected to link processing.

Then, in step ST26, it is determined whether a pixel in the vicinity of the link-processing pixel, for example, a pixel adjacent to the link-processing pixel has a boundary line which is available to be linked. When the determination is affirmative, the process proceeds to step ST27 where the boundary line of the link-processing pixel is linked to a boundary line having a start point nearest to an end point of the boundary line of the link-processing pixel. Then, in step ST28, a "used" flag is set to the linked boundary line and the pixel having the linked boundary line is set as a link-processing pixel and thereafter the process returns to step ST26 and the process described above is performed from step ST26 onward.

In step ST26, when the determination is negative, the process proceeds to step ST29 where a result of a series of the link processing is stored as a shape, and thereafter the process proceeds to step ST30. When the determination is negative in step ST23 or when the determination is affirmative in step ST24, the process directly proceeds to step ST30.

In step ST30, it is determined whether a next pixel exists in a raster order. When the determination is affirmative, the process proceeds to step ST31 where the next pixel is set as a pixel of interest, and thereafter the process returns to step ST23 and the processed described above are performed from step ST23 onward. On the other hand, when the determination is negative in step ST30, the process proceeds to step ST32 where the process is terminated.

Figure 13:
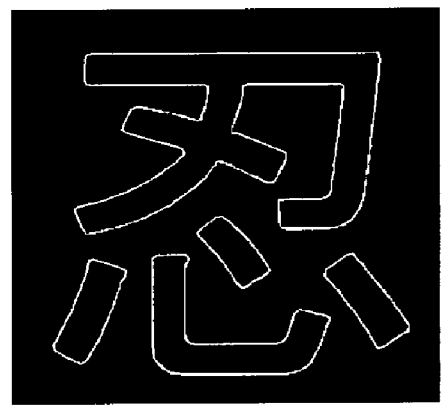
FIG. 13 shows a diagram illustrating a result of outline definition.

The boundary-line link processing is performed as illustrated in the flowchart of FIG. 8 whereby the boundary lines of the pixels at edge positions are linked to one another. Accordingly, an outline indicating a boundary of black-level and white-level regions of a still image are defined with high precision. FIG. 13 shows a result of outline definition processing for the still image shown in FIG. 9.

A description will now be made of a data generation unit used to generate still image data representing an image enlarged using an outline defined by the above-described outline definition unit. In the data generation unit, it is assumed that 1/ER of the image area, where ER represents an enlargement factor, is to be enlarged. For example, if the enlargement factor ER is 2, ½ of the image area is to be enlarged. The data generation unit increases the number of pixels in an image region of an image to be enlarged to obtain ER times the number of the pixel of the image region whereby still image data representing an enlarged image is generated. The enlargement factors may be independently set in the horizontal direction and the vertical direction of the image.

Figure 14:
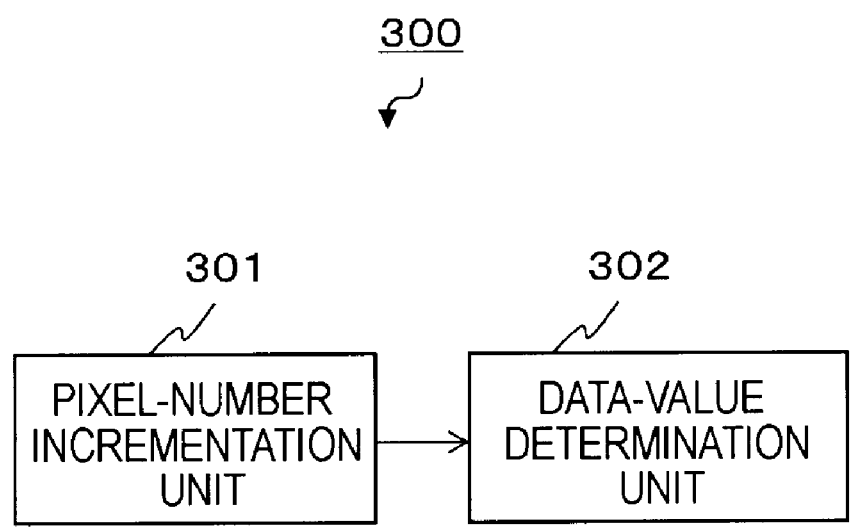
FIG. 14 shows a block diagram illustrating a function block of a data generation unit.

FIG. 14 shows a function block diagram of a data generation unit 300. The data generation unit 300 includes a pixel-number incrementation unit 301 and a data-value determination unit 302. The pixel-number incrementation unit 301 is used to increase the number of pixels in the horizontal and vertical directions of the image region of the image to be enlarged in accordance with an enlargement factor.

The data-value determination unit 302 determines data values of the pixels after the number of pixels has been increased, in accordance with a position of an outline defined by the outline definition unit. That is, a data value of a pixel in which an outline is not defined is set to "0" when the pixel is in a black-level region whereas a data value of a pixel in which an outline is not defined is set to "255" when the pixel is in a white-level region. A data value of a pixel in which an outline is defined is determined in accordance with an area ratio of a black-level region to a white-level region of the pixel. In this case, as the area of the white-level region is increased, the data value is increased.

A processing operation of the data generation unit will be described with reference to FIGS. 15A to 15D. FIG. 15A shows an example of pixels before the number of pixels is increased. The outline definition unit determines that a pixel having a data value of 123 and a pixel having a data value of 185 are determined as pixels located at edge positions. As shown in FIG. 15B, an outline indicating a boundary between a black-level region having a data value of "0" and a white-level region having a data value of "255" is generated in the pixel having a data value of 123 and the pixel having a data value of 185. In the data generation unit, the number of pixels in the horizontal direction and the number of pixels in the vertical direction are increased in accordance with a set enlargement factor as shown in FIG. 15C. Then, as shown in FIG. 15D, data values for the pixels are determined in accordance with a position of an outline.

According to the image processing apparatus 100 shown in FIG. 1, the outline definition unit 200 including the CPU 101 (refer to FIG. 2) generates boundary lines BL indicating boundaries between black-level regions and white-level regions in pixels which are located at edge positions and which have data values between a value representing a black level and a value representing a white level. The boundary lines BL are generated in accordance with data values of pixels located at the edge positions and the vicinities thereof (refer to FIG. 4). Then, the generated boundary lines are linked to one another to obtain an outline (refer to FIGS. 5A to 5D). Accordingly, the outline is generated not in units of pixels but with high precision.

According to the image processing apparatus 100 shown in FIG. 1, the data generation unit 300 including the CPU 101 (refer to FIG. 14) is used to increase the number of pixels in an image region to be enlarged by a set enlargement factor and to determine data values of pixels in accordance with an outline defined using the outline definition unit 200 (refer to FIG. 15). Since the outline defines a boundary of a black-level region and a white-level region of a still image with high precision, the number of pixels which include the outline and therefore have data values between a value representing a black level and a value representing a white level, which is increased when the image is enlarged, may be reduced in an outline portion. Accordingly, an enlarged image having a clear outline may be obtained.

Figure 16A:
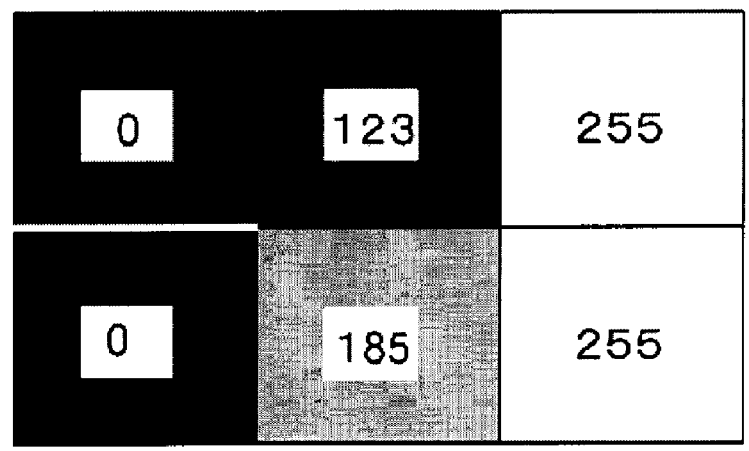
FIGS. 16A and 16B are diagrams illustrating data values of pixels when the number of pixels are increased without defining an outline.
Figure 16B:
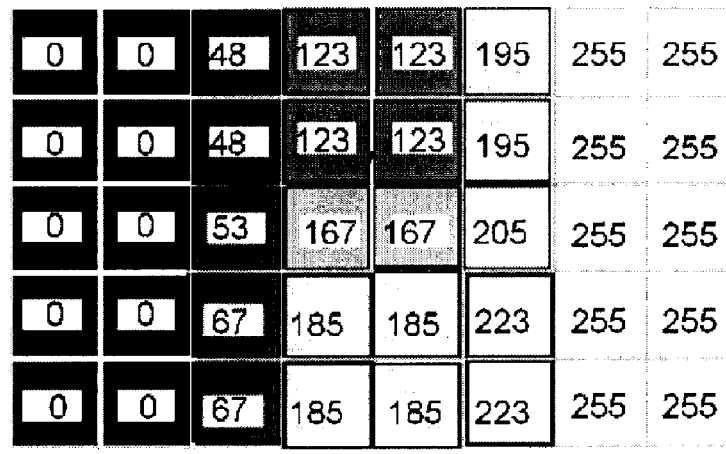

For example, FIG. 16B shows data values of the pixels when the number of pixels are increased without defining an outline shown in FIG. 15B but using only pixels shown in FIG. 16A (which are the same pixels shown in FIG. 15A). The number of pixels having data values between more than "0" and less than "255" which define an outline is larger than that shown in FIG. 15D.

Figure 17B:
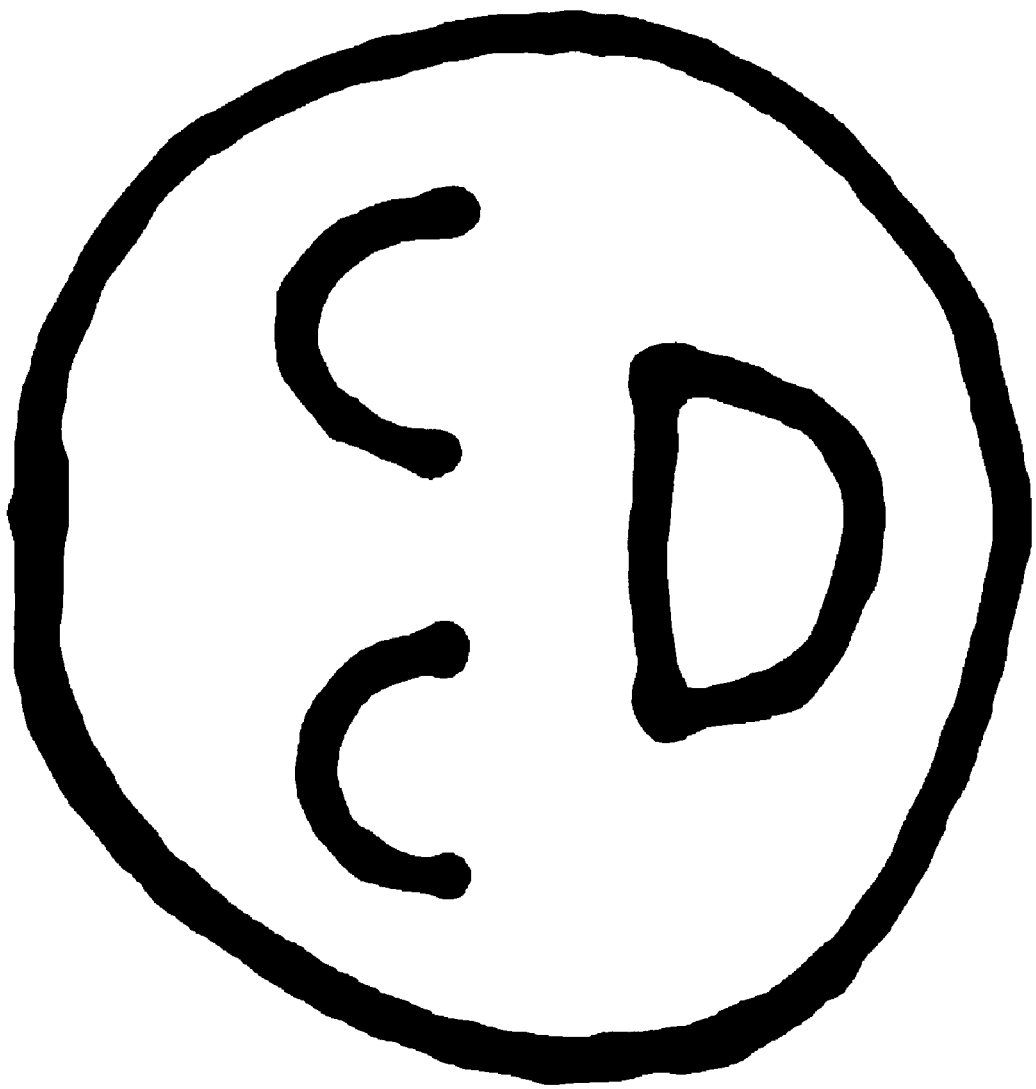
FIGS. 17A and 17B show examples of an image and an enlarged image thereof when an outline is defined.
Figure 17A:
Figure 18B:
FIGS. 18A and 18B show examples of an image and an enlarged image thereof when an outline is not defined.
Figure 18A:
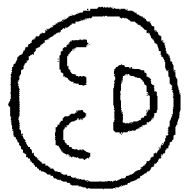

FIG. 17B is an enlarged image generated from an image shown in FIG. 17A (corresponding to FIGS. 15A and 16A) which is generated as still-image data and enlarged using an outline defined in advance. Therefore, the enlarged image has a clear outline. On the other hand, FIG. 18B is an enlarged image generated from the image shown in FIG. 18A (corresponding to FIGS. 15A and 16A) which is generated as still-image data and enlarged without defining an outline. Therefore, the enlarged image has an unclear outline and is a blurred image.

In the foregoing embodiment, although an outline indicating a boundary between a black-level region and a white-level region of a still image is obtained, the present invention is not limited to this. An outline indicating a boundary between a first-level region and a second-level region which has a data value larger than that of the first-level region may be similarly obtained.

In the foregoing embodiment, although an outline is defined for the image enlargement processing, the outline defined as described above may be used in a scanning technique and other techniques.

It should be understood by those skilled in the art that various modifications, combinations, sub-combinations and alterations may occur depending on design requirements and other factors insofar as they are within the scope of the appended claims or the equivalents thereof.

What is claimed is:

1. An outline definition apparatus comprising:
    an edge detection unit configured to detect pixels located at edge positions of a still image, each of the pixels located at the edge positions having a data value between a value representing a first level and a value representing a second level that is larger than the value representing the first level;
    a pixel extraction unit configured to extract the pixels located at the edge positions which are detected using the edge detection unit and extract pixels in the vicinity of the pixels located at the edge positions;
    a boundary-line generation unit configured to generate, in accordance with a data value of each of the pixels extracted using the pixel extraction unit, a boundary line indicating a boundary between a region of the first level and a region of the second level in each of the pixels which are located at the edge positions and are detected using the edge detection unit; and
    a link-processing unit configured to obtain an outline indicating a boundary between a region of the first level and a region of the second level in the still image by linking the boundary lines which are generated in the boundary-line generation unit and which are generated for the pixels which are located at the edge positions and are detected using the edge detection unit.

2. The outline definition apparatus according to claim 1, wherein the boundary-line generation unit includes:
    a boundary-angle detection unit configured to detect an angle of the boundary line of each of the pixels in accordance with, for each of the pixels located at the edge positions, differences between a data value of each of the pixel located at the edge position and data values of the pixels located in the vicinity of the pixel located at the edge positions;
    a boundary-intercept detection unit configured to detect intercepts of the boundary line in each of the pixels located at the edge positions, which has an angle detected using the boundary-angle detection unit, in accordance with a mixture ratio of the first level to the second level representing the data value of each of the pixel.

3. The outline definition apparatus according to claim 1, wherein the link-processing unit,
    sets a direction of the boundary line of each of the pixels located at the edge positions generated using the boundary-line generation unit so that a pixel having a large data value is located on the left or right side, and
    determines that a second boundary line which is to be linked to a first boundary line is a boundary line having a starting point nearest to an ending point of the first boundary line.

4. An outline definition method performed by an apparatus, the method comprising:
    detecting, by a processor of the apparatus, pixels located at edge positions of a still image, each of the pixels located at the edge positions having a data value between a value representing a first level and a value representing a second level that is larger than the value representing the first level;
    extracting, by the processor of the apparatus, the detected pixels located at the edge positions and extracting pixels in the vicinity of the pixels located at the edge positions;
    generating, by the processor of the apparatus, in accordance with a data value of each of the extracted pixels, a boundary line indicating a boundary between a region of the first level and a region of the second level in each of the pixels which are located at the edge positions and are detected; and
    obtaining, by the processor of the apparatus, an outline indicating a boundary between a region of the first level and a region of the second level in the still image by linking the boundary lines which are generated for the detected pixels located at the edge positions.

5. An image processing apparatus comprising:
    a data input unit configured to allow still-image data including a plurality of pieces of image data to be input;
    an outline definition unit configured to define an outline indicating an boundary between a region of a first level and a region of a second level in a still image on the basis of the still image data input using the data input unit, the second level being represented by a data value of pixels of the still image that is larger than a data value of pixels representing the first level; and
    a data generation unit configured to generate still image data for a region of the still image to be enlarged by increasing the number of pixels of the region to be enlarged in accordance with the outline defined in the outline definition unit,
    wherein the outline definition unit includes
        an edge detection unit configured to detect pixels located at edge positions of an still image, each of the pixels located at the edge positions having a data value between a value representing a first level and a value representing a second level that is larger than the value representing the first level,
        a pixel extraction unit configured to extract the pixels located at the edge positions which are detected using the edge detection unit and extract pixels in the vicinity of the pixels located at the edge positions,
        a boundary-line generation unit configured to generate, in accordance with a data value of each of the pixels extracted using the pixel extraction unit, a boundary line indicating a boundary between a region of the first level and a region of the second level in each of the pixels which are located at the edge positions and are detected using the edge detection unit, and
        a link-processing unit configured to obtain an outline indicating a boundary between a region of the first level and a region of the second level in the still image by linking the boundary lines which are generated in the boundary-line generation unit and which are generated for the pixels which are located at the edge positions and are detected using the edge detection unit.

* * * * *